Sept. 18, 1956  R. E. TULLOSS, JR  2,763,029
METHOD OF PRODUCING AN OPTICALLY CLEAR POLYETHYLENE FILM
Filed June 19, 1953
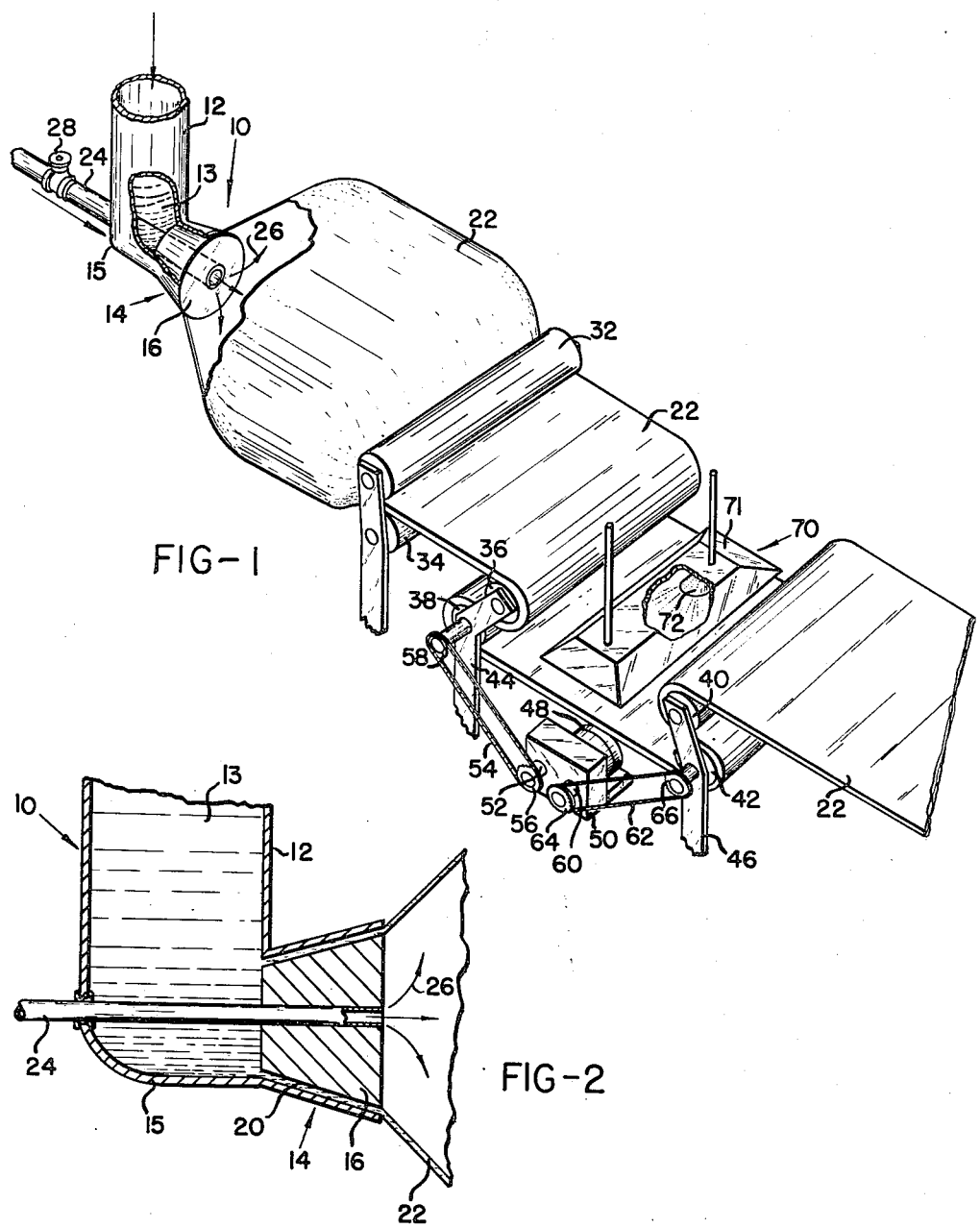
*INVENTOR.*
REES EDGAR TULLOSS JR.
BY Toulmin & Toulmin
ATTORNEYS ମ
United States Patent Office 2,763,029
Patented Sept. 18, 1956

2,763,029

METHOD OF PRODUCING AN OPTICALLY CLEAR POLYETHYLENE FILM

Rees E. Tulloss, Jr., East Orange, N. J.

Application June 19, 1953, Serial No. 362,759

2 Claims. (Cl. 18—47.5)

This invention relates to films and more particularly to a method for treating plastic films, especially polyethylene and the like thermoplastics to improve their physical characteristics.

Films made of normally solid ethylene polymers, as heretofore produced and widely used for packaging and wrapping material, and in the form of a self-sustaining sheet of polyethylene, are characterized by haziness, cloudiness and low clarity.

An optically clear film, however, has long been sought but never attained heretofore. Various methods of compounding and treating such films have been suggested for overcoming this undesirable haziness and cloudy property, but prior to this invention such attempts have proved of little value.

One method previously known for treating thermoplastic films of this nature to lessen the haziness, involves quenching of the heated polyethylene or thermoplastic film with water. Another method comprises a modification thereof consisting of cooling the clear molten films until the haziness or cloudiness appears, and then reheating this hazy film and recooling it to produce a product having less cloudiness than otherwise would be the case.

It is an object of this invention to provide a relatively simple and commercially practical method for preparing thermoplastic films, especially polyethylene films, which are substantially clear and of a desired thickness.

It is a further object to provide a process for preparing ethylene polymer films which are clear without employing quenching methods.

Another object of the invention is to provide a process for manufacturing polyethylene films which are of exceptionally thin character such as have not heretofore been produced.

These and other objects and advantages of the invention will appear hereinafter.

A suitable apparatus for carrying out the invention is illustrated in the accompanying drawings wherein—

Figure 1 is a diagrammatic perspective view of an apparatus for extruding and stress-working polyethylene films extruded in the form of a tube, the extrusion die and heating means being shown partly broken away and in section to better illustrate the construction thereof, and Figure 2 is an enlarged detail view of the extruder die and header shown in the embodiment of Figure 1.

Briefly, the process of the present invention which results in the production of clear, thin polyethylene films comprises the extrusion of a tubular web or film of ethylene polymer and working the same to bring about first lateral and then longitudinal orientation of the web and, when desirable, drawing it down to a very thin film.

Polyethylene films now commercially available are characterized by a milk-white haziness and it has not been found practical to manufacture the films in a thickness below aboue 0.001 inch by current commercial processes. There is considerable demand, however, for polyethylene films which are optically clear and one which is extra thin, for example on the order of 0.0007 to 0.003 inch in thickness. Polyethylene films of high clarity and which are extremely thin may be produced by employing the method and apparatus of this invention.

It has been fairly well established that the haziness of polyethylene films results from the formation of submicroscopic crystalline structures. It has been found that these crystalline formations, which normally are distributed more or less at random throughout the film, are rearranged or aligned in a definite pattern or oriented in such a way by working the film in accordance with the present process so as to produce a substantially optically clear film, and a film which may be made extremely thin.

It has been found that polyethylene films can be made optically clear by orientation, as aforementioned, by means of stress working the film at a temperature below the melting point of polyethylene. The simplest means of stress working polyethylene films is by stretching the film.

It has further been found, however, that until the employment of the present process, it has been virtually impossible to stress work or stretch polyethylene film in the same direction in which the film was originally extruded or cast to a sufficient degree to produce an optically clear film through orientation.

It is believed that the reason for this is that during the current commercial methods of extruding or casting polyethylene films, some degree or stress is applied to the film in the direction of extrusion or casting while the film is passing from the molten state to the solid homogeneous, cooled state. Further, since the crystalline formations come into existence just below the melting point of the polyethylene (at a temperature of approximately 219° F. for commercial extrusion grades of polyethylene resin) and continue to grow until the polyethylene is substantially cooled, the axis of crystalline formation and growth tends to lie in the direction of extrusion or casting, because of the aforementioned stress being applied in this direction. This means that some degree of orientation has set up in the direction of extrusion or casting at the time when the film is sufficiently cooled to be stress worked. However, this degree of orientation of the film is not pervasive or complete enough to result in a clear film, but it is sufficient to prevent further stress working to achieve the high degree of orientation that results in a clear film. In brief, when polyethylene films of current manufacture are stress worked or stretched in the direction of casting or extrusion, the film ruptures before it can be made clear, or, moreover, before the film can be drawn down substantially in thickness.

Now it has been found that polyethylene films can be made optically clear by stretching if the direction of stress or stretch is applied at right angles to any axis of orientation that may exist in the film after it has been extruded or cast, and cooled down to a solid homogeneous state in accordance with this invention. Thus, utilizing the invention, polyethylene films now commercially available can be made optically clear by stretching at right angles to the direction of extrusion or casting. Stretching of such films may be accomplished by the use of a tenter frame or a similar sideways stretching device. The sideways stress is applied against the direction of the axis of orientation of such films as set up during the extrusion or casting.

Attempts to effect sideways stretching of relatively thin films, in the order of about .003" or under, has been found, however, to be extremely difficult and costly, if not completely unfeasible in the cae of polyethylene films, due to the tendency of the film to rupture at the edge points where the film is mechanically gripped for sideways stretching.

It is one of the purposes of this invention, therefore, to provide a practical and commercially useful process whereby polyethylene films may be extruded in a special manner and subsequently stress worked in the direction of extrusion so as to orient the film in a longitudinal direction and produce an optically clear film, and a film which may be drawn down to an extremely thin web.

As has been stated, in order to produce an optically clear polyethylene film through orientation, it is necessary to stress work the film at right angles to whatever axis of orientation was set up during the process of extrusion or casting. Therefore, it is one of the elements of the present process to provide for more lateral orientation of the crystallites throughout the film than orientation in the longitudinal direction during the initial extrusion process, so that a subsequent stretching force can be applied in the direction of extrusion to redistribute to crystalline formations into a definite longitudinal orientational pattern. Moreover, the greater the degree of lateral orientation, as developed by means of applying working stresses laterally of the film or web during the initial extrusion process, the greater the degree of subsequent longitudinal stretching and orientation and also drawing down in thickness of the film that can be effected short of rupturing the film.

In this manner, polyethylene films which have been treated whereby the same are subjected to lateral stretching and orientation during the initial extrusion can be readily drawn down to a film of extremely thin thickness without rupturing. In contrast to this, it has been observed that commercially available polyethylene films cannot be stretched with or without the application of heat, to the point at which a major degree of thickness reduction is achieved without breaking the film. This has been a decided disadvantage in prior polyethylene films.

In order to achieve a film characterized by an initial degree of lateral orientation, the present process employs a suitable modification of the so-called "extrusion-blown" method. In practicing the method of this invention, a moderately wide tubing of polyethylene is extruded from a tubular die and drawn down to a thin web or film while subjected to both lateral as well as longitudinal stretching forces.

The lateral force is applied by injecting air under pressure into the inside of the extruded tube through an air jet in the center of the extrusion die while the longitudinal force is applied through pinch rolls that squeeze the extruded tube together, thus trapping the air blown into the tube, and which serve to draw the tubing away from the extrusion die at a suitable rate.

Customarily, in making films employing the extrusion and blowing methods to form a wide tubing web, the film is drawn down at a rate substantially in excess of the blow-out rate which results in the production of a film similar to that made by casting or utilizing the flat die extrusion method as aforementioned, inasmuch as the film is characterized by a certain degree of longitudinal orientation.

In the method of producing films by the present invention, the draw-down rate is decreased and the amount of lateral or "blow" stress rate is increased, resulting in the production of a tubular polyethylene web characterized by a greater degree of lateral orientation of the crystallites or molecular polymer structures than extending longitudinally of the film. This is a significant feature of the process inasmuch as it has been found to be important to effect a substantial amount of lateral orientation of the crystallites as compared to the longitudinal orientation, as pointed out above, so that subsequent longitudinal stretching and orientation can be accomplished to the greatest possible degree.

The cloudiness or haziness of the polyethylene films appears to result from the formation of these crystallites of long polymeric molecules when the plastic is cooled from a hot melted state to a solid homogeneous state or finished product. Polyethylene films manufactured in accordance with the present invention may be stretched while maintained below the melting point to such a degree that the crystallites are rearranged or orientated in such a manner that the haziness which normally develops is absent and a substantially optically clear film is produced. Further, due to the application of first lateral and then longitudinal orientation forces to the film, a definite pattern of the crystallites results which produces a film possessing a high degree of transparency and one which can be drawn down to an extremely low thinness, for example on the order of 0.0005 inch and lower.

The process of the invention thus may be used to produce polyethylene extruded films wherein the primary axes of the crystallites lie at right angles to the direction of extrusion, which films may then be stretched in the direction of extrusion on a suitable tensioning machine, so that the crystallite formations are transformed or rearranged in a uniform manner or pattern throughout the length of the film. The initial lateral orientation and subsequent longitudinal stretching and orientation results in producing a film which is not only clear, but extremely thin. It is a significant point, however, that the clarity of the film is not of necessity a function of the thinness but a function of the crystallite redistribution or orientation.

The improved results in the manufacture of thermoplastic self-sustaining films of this character may be accomplished by stretching commercially prepared polyethylene films at right angles to the direction of extrusion or casting, as aforementioned, thus effecting a greater degree of lateral orientation of the crystallites than occurs longitudinally of the film.

The present invention is thus distinguished from the prior art in that tensional stretching forces are applied to the polyethylene film in a manner so as to permit the tubular web or sheet to orient laterally before it undergoes longitudinal stretching and orientation. This is accomplished by subjecting the material to forces which are directed laterally or at right angles to the direction of extrusion before subjecting the material to longitudinal stretching forces. This permits the film of material to be oriented initially more in a lateral than longitudinal direction so that subsequently substantially the proper degree of longitudinal orientation of the molecular crystallites can be effected and thus a film produced having the improved characteristic properties desired.

The invention and manner in which it may be practiced will become further manifest from the following detailed description taken in conjunction with the accompanying drawings forming a part of the specification, and wherein an embodiment of the apparatus for practicing the invention is illustrated.

Referring to the drawings, wherein like reference characters designate similar parts, the reference numeral 10 designates the extrusion tube generally, for receiving and delivering molten polyethylene or other thermoplastic material being treated to the die for extrusion. The extruder 10 comprises a feed barrel 12 in which the molten thermoplastic material, such as illustrated at 13, is fed under suitable pressure to a die generally designated 14 and connected to the feed barrel by an elbow section 15. The die 14 comprises a head 16 suitably secured in an outwardly flared portion and forming an annular orifice 20 from which the molten thermoplastic material is discharged in the form of a tubular web 22.

The die 14 is provided with an air supply line 24, centrally disposed through the elbow 15 and extruder die head 16 whereby air under pressure may be introduced interiorly of the tubing 22 to inflate the same as indicated by the arrows 26 in Figure 2. Control of the air supply to the interior of the tubing is permitted by manipulation of a valve 28 disposed in the line 24.

As soon as the molten thermoplastic material is extruded from the die orifice, it is subjected to the inflating air supply through line 24 which expands the tubing to a predetermined diameter, as illustrated in Figure 1. Inflating air is introduced in sufficient amount to expand or inflate the tubing while in a moldable plastic condition to stretch the thermoplastic laterally to a predetermined degree and bring about maximum lateral orientation of the crystallites of the polymer while the plastic material is passing from the molten state to the solid homogeneous state without rupturing the tubular film. After the tubing has been thus laterally expanded to the desired degree, and drawn through a sufficient space of cool air (or other cooling medium) so that the same has reached a substantially cooled, solid and homogeneous state the same is then drawn between squeeze rolls 32 and 34.

The tubular thermoplastic material, after passing the squeeze rolls 32 and 34, is subjected to longitudinal stretching and drawing down by being drawn between the sets of input rolls 36, 38 and output rolls 40 and 42, the rolls being suitably mounted on fixed spaced frame members 44 and 46 respectively. The input rolls 36 and 38 are rotated at a lesser peripheral speed than the output rolls 40 and 42. One roll of each set of rolls is arranged to be driven while the other rolls are mounted for free pressure contact rotation.

Suitable means is provided for driving the input and output roll sets at the desired differential speeds. This may comprise an electric motor 48 or other suitable prime mover means which are drivingly connected to the power input shaft of a gear box 50. A power take-off shaft 52 on the gear box is drivingly connected through drive chain means 54 and suitable sprockets 56 and 58 to the input roll 38. The power take-off shaft 60 is similarly connected to drive the output roll 42 by means of a chain 62 and cooperating sprockets 64 and 66. The gear box 50 is suitably arranged to provide controlled and predetermined speed differentials between the power take-off shafts 52 and 60 whereby the desired differential speeds may be obtained between the input and output sets of rolls whereby the thermoplastic web of material may be stretched or drawn down to the desired degree.

To heat the material during longitudinal stretching of the film and while drawing the same therealong between the input and output rolls, heating means generally designated 70 are provided. The heater 70 may comprise a rectangularly-shaped bank 71 consisting of a series of infra red lamps, such as shown at 72, the bank being of sufficient dimensions and capacity to extend over and uniformly heat the web of thermoplastic material as the same is drawn along thereunder, as illustrated in Figure 1. Conventional means may be used to control the heat applied to the web whereby the thermoplastic material is heated and made pliable to the proper extent to facilitate its stretching.

The temperature to which the film should be heated will depend on the particular thermoplastic material being treated. Sufficient heat must be applied to insure uniform stretching of the film, but the temperature of the film must not be raised above the melting point of the thermoplastic, which, in the case of polyethylene, lies between about 212° to 250° F. A desired temperature range range is between about 120° and 190° F.

Although the heater 70 functions primarily to cause heating and an increase in the pliability of the plastic material, the heating may, if desired, be raised sufficiently to remove any moisture contained in the plastic sheet. Additional heating elements may be utilized for this purpose, as required. Heating of the plastic material may be accomplished also using hot air or liquid. For example, thermoplastic material may be passed through a heated chamber, the chamber being suitably heated by the use of hot air or by circulating heated liquid through the walls of the chamber. The material may also be heated, if desired, by passing the plastic sheet through a bath of inert liquid held at the proper temperature. Further, use may be made of electrically heated conductors or high frequency induction heating may be employed.

In carrying out the process of this invention, the thermoplastic material to be treated is introduced through the extruder and extruded in the form of a seamless tubing. The tubing is then subject to inflation by air so as to laterally expand the tubing to the desired diameter while it is in the molten state, the amount of lateral stretching being dependent upon the size of the tubing and thermoplastic material being treated. In the case of a polyethylene thermoplastic sheet, the lateral expanding of the film is sufficient to orientate the crystallites whereby they are aligned substantially at right angles to the directional movement of the sheet of material.

The degree of lateral orientation of the extruded tubing may be controlled by varying the size of the blown out tubing in relation to the size of the tubular die, that is, by controlling the relationship between the circumferenec of the blown out tubing to the circumference of the orifice of the tubular die, and by controlling the rate at which the plastic material is being drawn away from the extrusion die, or drawn down rate, as compared to the rate at which the plastic material is forced by the extruder from the tubular die, or extrusion rate.

For example, if the tubular web is expanded to twice the circumference of the die orifice and at the same time the draw down rate is twice the extrusion rate, then the tubular web, after being cooled, is characterized by an equal amount of lateral and longitudinal orientation. If the expansion or blow out ratio (size of expanded tubing/size of die) is greater than the draw down ratio (draw down rate/extrusion rate), then the tubular web will have a greater degree of lateral orientation than longitudinal.

For the purpose of this process only a slightly greater degree of lateral orientation over longitudinal is necessary, for example a ratio of about 1.3 laterally to 1 longitudinally. A greater ratio, however, of about 2 to 3 laterally to 1 longitudinally, results in a film which can be worked subsequently with greater ease and with less possibility of breakage of the film. After the tubing has been expanded the desired amount, it is collapsed, e. g. by passing the same between the nip of the squeeze rolls 32 and 34. Thereafter the collapsed tubing is drawn between the input and output set of rolls and the web subjected to longitudinal stretching whereby the thermoplastic material becomes longitudinally oriented, and may be drawn down to a very thin thickness, the same being on the order of a thousandth of an inch or less, whereby the film is made substantially optically clear and extremely thin.

The invention is particularly suitable for the production of polyethylene thermoplastic films of a thickness of 0.0001 to 0.0007 of an inch or less, and using commercial polyethylene compositions which normally have a hazy or cloudy appearance when produced in the conventional manner.

The polymers preferably used in the practice of this invention are the solid ethylene polymers such as for example described in U. S. Patents 2,153,553, 2,188,465 and 2,200,429. These polymers of ethylene mixed or blended with other polymerizable organic compounds may be treated in accordance with the method and utilizing the apparatus of this invention to produce a finished product of improved physical properties. Polymers of ethylene are solid at normal room temperatures and correspond in chemical compositions to long chain or multiple C-hydrogen groups, i. e. $(CH_2)_x$ the compounds having molecular weights of above about 6000.

A principal feature of the present process, in order to produce a thermoplastic film having an improved clarity and very thin thickness, is the provision of substantially initial lateral orientation of the tubular web of thermoplastic material during the extrusion process, and the subsequent effecting of longitudinal stretching and orientation so that the primary axis of orientation lies substantially parallel to the direction of extrusion, which means that a substantialy definite pattern of crystallite formation is effected.

The invention provides a method whereby tubing of thermoplastic material may be extruded and the same oriented laterally and then longitudinally to a predetermined degree so as to alter its physical characteristics. The invention is especially useful for the production of polyethylene films. However, the invention is not to be specifically limited to this thermoplastic material as other equivalent or similar thermoplastic films may be made such as by the use of polyvinyl alcohol and other vinylene plastics.

Inasmuch as obvious changes and variations may be made in the apparatus and method without departing from the nature and spirit of the invention, it is to be understood that the invention is not to be restricted to the particular apparatus and exact order of steps of treating the thermoplastic material. For example, stretching or working of the film may be reversed, that is, subjected to stretching longitudinally and thereafter stretched laterally so as to produce a finished thermoplastic film having the desired clarity and thinness. Further, the invention is not to be restricted other than except as set forth in the appended claims.

I claim:

1. A method of producing a self-sustaining polyethylene film or sheet which is substantially optically clear and having improved physical characteristics which comprises the steps of extruding a tubing of polyethylene, inflating said tubing while said polyethylene is in a thermoplastic condition to stress-work the same laterally to cause a realignment of the crystallites of the film in a lateral direction to an extent that said lateral orientation is slightly greater than any longitudinal orientation existing at that time, thereafter heating said film to a temperature to assure uniform stretching of the film but below the melting point of the film material, and simultaneously stretching the polyethylene film longitudinally whereby the crystallites of the film are oriented longitudinally to produce a film which is optically clear and of a uniform thickness.

2. A method of producing a self-sustaining polyethylene film or sheet which is substantially optically clear and having improved physical characteristics which comprises the steps of extruding a tubing of polyethylene, inflating said tubing while said polyethylene is in a thermoplastic condition to stress-work the same laterally to cuase a realignment of the crystallites of the film in a lateral direction to an extent that said lateral orientation is of the order of 1.3 times greater than any longitudinal orientation existing at that time, thereafter heating said film to a temperature to assure uniform stretching of said film but below the melting point of the film material, and simultaneously stretching the polyethylene film longitudinally whereby the crystallites of the film are oriented longitudinally to produce a film which is optically clear and of a uniform thickness.

References Cited in the file of this patent

UNITED STATES PATENTS

| | | |
|---|---|---|
| 2,448,433 | Irons et al. | Aug. 31, 1948 |
| 2,529,897 | Bailey et al. | Nov. 14, 1950 |
| 2,668,988 | Bailey et al. | Feb. 16, 1954 |

OTHER REFERENCES

Bryant, Abstract of Application Ser. No. 691,180, published May 22, 1951, 646 O. G. 1376.